United States Patent
Baskin (10) Patent No.: US 8,147,198 B2
(45) Date of Patent: Apr. 3, 2012

(54) HELICOPTER ROTOR YOKE AND METHOD OF MAKING SAME

(75) Inventor: Bryan K. Baskin, Arlington, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 857 days.

(21) Appl. No.: 12/279,742

(22) PCT Filed: Feb. 24, 2006

(86) PCT No.: PCT/US2006/006628
§ 371 (c)(1),
(2), (4) Date: Aug. 18, 2008

(87) PCT Pub. No.: WO2007/106064
PCT Pub. Date: Sep. 20, 2007

(65) Prior Publication Data
US 2010/0221119 A1    Sep. 2, 2010

(51) Int. Cl.
*F01D 5/18* (2006.01)
(52) U.S. Cl. ......... 416/141; 416/143; 416/230; 416/233
(58) Field of Classification Search ............. 416/134 A, 416/141–143, 230, 244 R
See application file for complete search history.

(56) References Cited

U.S. PATENT DOCUMENTS

| | | | | |
|---|---|---|---|---|
| 4,293,276 A | * | 10/1981 | Brogdon et al. | 416/134 A |
| 4,568,245 A | * | 2/1986 | Hibyan et al. | 416/134 A |
| 4,585,393 A | * | 4/1986 | Hibyan et al. | 416/134 A |
| 5,211,538 A | * | 5/1993 | Seghal et al. | 416/1 |
| 5,358,381 A | * | 10/1994 | Covington et al. | 416/134 A |
| 5,690,474 A | | 11/1997 | Byrnes et al. | |
| 2002/0153450 A1 | * | 10/2002 | Sims et al. | 244/17.11 |
| 2010/0221119 A1 | * | 9/2010 | Baskin | 416/244 R |

FOREIGN PATENT DOCUMENTS

| | | |
|---|---|---|
| CN | 1171356 A | 1/1998 |
| JP | 10059295 A | 3/1998 |

OTHER PUBLICATIONS

Canadian Office Action dated May 28, 2010 from corresponding CA Patent Application No. 2,637,461.
Chinese Office Action dated Mar. 11, 2011 from corresponding CN Patent Application No. 200680053378.1.
Japanese Examination Report dated May 25, 2011 from corresponding JP Patent Application No. 2008-556290.

* cited by examiner

*Primary Examiner* — Michael Lebentritt
(74) *Attorney, Agent, or Firm* — James E. Walton; Richard G. Eldredge (57) ABSTRACT

A rotor yoke includes a blade attachment portion, a mast attachment portion, and an intermediate portion extending between the blade attachment portion and the mast attachment portion. The intermediate portion, the blade attachment portion, and the mast attachment portion define an optional inner edge, such that the inner edge, if present, defines an opening. The rotor yoke further includes a peripheral, outer edge extending about the blade attachment portion, the intermediate portion, and the mast attachment portion. At least one of the outer edge and the inner edge, if present, includes a reduced thickness portion exhibiting a thickness that is less than a thickness of an adjacent portion of the rotor yoke.

14 Claims, 5 Drawing Sheets

```
┌─────────────────────────────────────┐
│ PROVIDING A ROTOR YOKE HAVING AN    │─ 901
│ EDGE EXHIBITING SUBSTANTIALLY THE   │
│ SAME THICKNESS AS AN IMMEDIATELY    │
│ ADJACENT PORTION OF THE ROTOR       │
│ YOKE                                │
└─────────────────────────────────────┘
                  │
                  ▼
┌─────────────────────────────────────┐
│ REDUCING A THICKNESS OF AT LEAST A  │─ 903
│ PORTION OF THE EDGE OF THE ROTOR    │
│ YOKE                                │
└─────────────────────────────────────┘
```

HELICOPTER ROTOR YOKE AND METHOD OF MAKING SAME

TECHNICAL FIELD

The present invention relates to helicopters and, in particular, to yokes for coupling helicopter blades to a mast.

DESCRIPTION OF THE PRIOR ART

Each blade of the main rotor assembly of a helicopter must be connected to the main support mast, usually by means of a rotor yoke, in a manner allowing several degrees of freedom. Such an interconnection is subjected to high and repeated stresses of both torsional and centrifugal natures, and is therefore an extremely important component of the aircraft. Each blade must be able to rotate about its longitudinal axis to provide pitch control. Each blade must be able to flap in a direction perpendicular to the rotor plane to accommodate vertical loads. In some instances, each blade must be able to pivot within the rotor plane to provide for lead-lag control. The manner in which the blades are secured to the main support mast enables a helicopter to be controlled and maneuvered in flight.

Various structures and mechanisms have been utilized to interconnect the helicopter blades and the support mast. The prior art includes several examples of articulated metal couplings. Such couplings have suffered from the disadvantages of weight, cost, high maintenance requirements, and low useful life. There have been several attempts to eliminate one or more of the articulations in such couplings in order to simplify construction and reduce costs. Some rotor hubs or yokes are pivotally secured to the support mast, and are characterized by a flat plate construction resilient enough to act as a virtual hinge and thereby accommodate flapping of the blades.

More recently, glass fibers and other composite materials have been employed in the fabrication of helicopter rotor system components. For example, a rotor yoke has been constructed by forming a loop from wound filaments with layers of cross plies normal to the central plane of the loop arranged only in the sides thereof. In comparison to a machined metal forging, glass fibers and other composite materials have more favorable fatigue characteristics resulting in longer useful life. In addition, the use of such materials simplifies construction and reduces costs. One of the problems encountered in utilizing such materials in helicopter rotor yokes, however, has been separation of the composite material layers, known as delamination, sometimes due to interlaminar shear. In some situations, a helicopter blade may flap to a greater degree than desired. In such cases, the excessive flapping places stresses on particular portions of the yoke that exceed the interlaminar strength of the composite material in those areas. Moreover, the allowable degree of blade flapping available for a particular helicopter design are limited by the interlaminar strength of the composite material.

There are many designs of helicopter yokes well known in the art; however, considerable shortcomings remain.

SUMMARY OF THE INVENTION

There is a need for an improved rotor yoke for a helicopter.

Therefore, it is an object of the present invention to provide an improved rotor yoke for a helicopter.

These and other objects are achieved by providing a rotor yoke for a helicopter. The rotor yoke includes a blade attachment portion, a mast attachment portion, and an intermediate portion extending between the blade attachment portion and the mast attachment portion. The intermediate portion, the blade attachment portion, and the mast attachment portion define an optional inner edge, such that the inner edge, if present, defines an opening. The rotor yoke further includes a peripheral, outer edge extending about the blade attachment portion, the intermediate portion, and the mast attachment portion. At least one of the outer edge and the inner edge, if present, includes a reduced thickness portion exhibiting a thickness that is less than a thickness of an adjacent portion of the rotor yoke.

In another aspect, the present invention provides a rotor yoke for a helicopter. The rotor yoke includes a pair of spaced apart longitudinal, side portions having ends; a transverse, central portion interconnecting the side portions; and a pair of outboard portions interconnecting the ends of the side portions. The side portions, central portion, and end portions define an outer edge and an inner edge, such that the inner edge defines an opening. One of the outer edge and the inner edge includes a reduced thickness portion exhibiting a thickness that is less than a thickness of an adjacent portion of the rotor yoke.

In yet another aspect of the present invention, a rotor yoke assembly is provided. The rotor yoke assembly includes a plurality of rotor yokes, fixedly clocked with respect to one another. At least one of the plurality of rotor yokes includes a blade attachment portion, a mast attachment portion, and an intermediate portion extending between the blade attachment portion and the mast attachment portion. The intermediate portion, the blade attachment portion, and the mast attachment portion define an optional inner edge, such that the inner edge, if present, defines an opening. The rotor yoke further includes a peripheral, outer edge extending about the blade attachment portion, the intermediate portion, and the mast attachment portion. At least one of the outer edge and the inner edge, if present, includes a reduced thickness portion exhibiting a thickness that is less than a thickness of an adjacent portion of the rotor yoke.

In another aspect, the present invention provides a method for making a rotor yoke. The method includes the steps of providing a rotor yoke having an edge exhibiting substantially the same thickness as an adjacent portion of the rotor yoke and reducing a thickness of at least a portion of the edge of the rotor yoke.

In yet another aspect, the present invention provides a method for making a rotor yoke. The method includes the steps of determining an area of the rotor yoke that will experience high interlaminar shear strain when in use and reducing a thickness of an edge of the rotor yoke proximate the area of the rotor yoke that will experience high interlaminar shear strain when in use.

The present invention provides significant advantages, including: (1) providing a helicopter rotor yoke that can withstand larger degrees of blade flapping; (2) providing a helicopter rotor yoke that lessens the edge effects of interlaminar shear strains when in use; and (3) providing a helicopter rotor yoke that has a greater economic life than conventional rotor yokes; and (4) providing a more durable helicopter rotor yoke.

Additional objectives, features and advantages will be apparent in the written description which follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents a helicopter rotor yoke exhibiting a tapered, chamfered, or otherwise reduced-thickness edge portion. Preferably, the reduced-thickness edge portion corresponds with an area of high interlaminar shear strain when the rotor yoke is in service. By reducing the thickness at the edge of an area that experiences high interlaminar shear strain, the shear strain is moved away from the edge, thus increasing the interlaminar shear strength of the rotor yoke.

Figure 1:
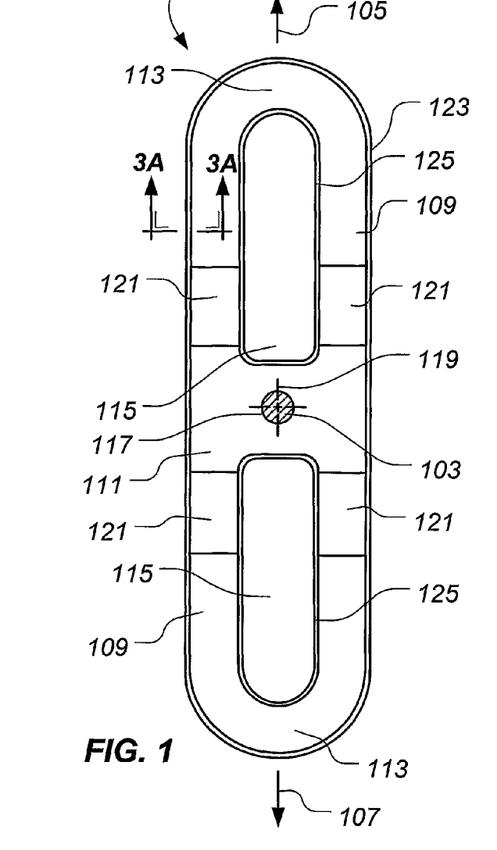
FIG. 1 is top, plan view of a first illustrative embodiment of a rotor yoke according to the present invention.
Figure 2:
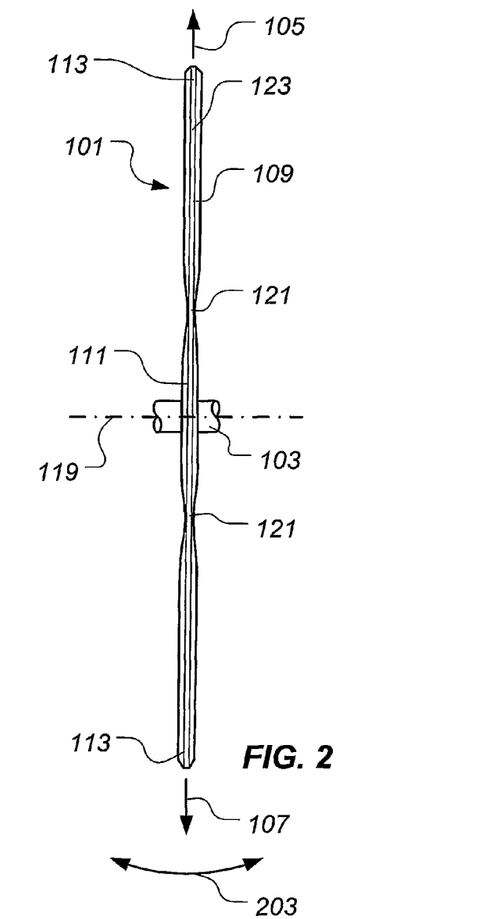
FIG. 2 is a side, elevational view of the rotor yoke of FIG. 1.

FIGS. 1 and 2 depict a first illustrative embodiment of a helicopter rotor yoke 101 according to the present invention. FIG. 1 provides a top, plan view of rotor yoke 101 and FIG. 2 depicts a side, elevational view of rotor yoke 101. Rotor yoke 101 is employed to interconnect a mast 103 and a pair of helicopter blades 401 (shown in FIG. 4) extending in the directions of arrows 105 and 107. Note that, while mast 103 is illustrated in FIGS. 1 and 2, mast 103 does not form part of rotor yoke 101 but is shown to depict the relationship between mast 103 and rotor yoke 101. In the illustrated embodiment, the general configuration of rotor yoke 101 is that of an elongated loop. Rotor yoke 101 includes a pair of spaced apart longitudinal side portions 109 interconnected by a transverse central portion 111, at which mast 103 is mounted. The ends of side portions 109 are interconnected by rounded, outboard portions 113, to which helicopter blades 401 (shown in FIG. 4) are coupled. Side portions 109, central portion 111, and outboard portions 113 define, in this particular embodiment, two openings 115 in which various components of the helicopter are mounted but not shown. In some embodiments, however, openings 115 are omitted. Helicopter mast 103 is received through a hole 117 defined by central portion 111, such that a central, longitudinal axis 119 of mast 103 substantially coincides with a center of rotor yoke 101.

In the illustrated embodiment, each side portion 109 of rotor yoke 101 defines two flexure portions 121. Flexure portions 121 are located outboard of central portion 111 and comprise fewer composite plies than, for example, other portions of side portions 109, resulting in reduced cross sections of flexure portions 121. Provision of flexure portions 121 permits helicopter blades 401 (shown in FIG. 4) to flap in the directions of arrows 201 and 203. The amount of reduction in cross-sectional area of flexure portions 121 is tailored to the specific flexural requirements of a rotor assembly and, thus, is implementation specific.

One particular composite laminate construction of rotor yoke 101 is disclosed in commonly-owned U.S. Pat. No. 4,293,726 to Brogdon et al., entitled "Laminated Composite Rotor Yoke," except that rotor yoke 101 defines one or more reduced-thickness edges. U.S. Pat. No. 4,293,726 to Brogdon et al. is hereby incorporated by reference for all purposes. Other composite laminate constructions, however, are possible and depend upon the particular design requirements for rotor yoke 101. In various embodiments, rotor yoke 101 comprises one or more plies of composite material, such as fiberglass/epoxy composite material, produced using manual construction methods, fiber placement, tow placement, fiber winding, tow winding, or other such composite manufacturing techniques. The scope of the present invention, however, encompasses any suitable composite laminate construction of rotor yoke 101.

In the embodiment of FIGS. 1 and 2, rotor yoke 101 defines an outer edge 123 and inner edges 125, which define openings 115. In the illustrated embodiment, edges 123, 125 exhibit reduced thicknesses, as compared to portions of rotor yoke 101 adjacent, or immediately adjacent, to edges 123, 125. It should be noted, however, that only a portion of outer edge 123 and/or a portion of one of inner edges 125 may exhibit a reduced thickness. For example, only a portion of one of inner edges 125 may have a reduced thickness, while the remainder of that inner edge 125 is not reduced in thickness.

Figure 3A:
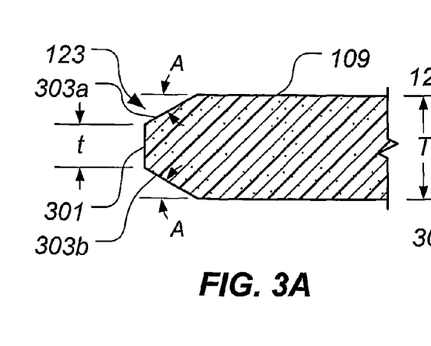
FIGS. 3A-3D are cross-sectional views illustrating exemplary edge profiles of the rotor yoke of FIG. 1, taken along the line 3A-3A in FIG. 1.

To achieve a reduced edge thickness at a particular location, rotor yoke 101 defines an edge profile, such as the edge profiles illustrated in FIGS. 3A-3D. FIG. 3A is a cross-sectional view of rotor yoke 101, taken along the line 3A-3A in FIG. 1. The views provided by FIGS. 3B-3D correspond to the view of FIG. 3A. Each of these views illustrates outer edge 123 as having a reduced thickness. However, as noted above, the scope of the present invention is not so limited. Rather outer edge 123 and/or one or both inner edges 125, or a portion thereof, may exhibit a thickness that is smaller than an adjacent portion of rotor yoke 101.

Preferably, as shown in the embodiment of FIG. 3A, edge 123 exhibits a frustotriangular edge profile in cross-section. The term "frustotriangular" means a truncated triangle, e.g., the part that is left when triangle is cut by a line parallel to the base of the triangle and the apex-portion is removed. Edge 123 transitions in thickness from a thickness T of side portion 109 to a thickness t of edge flat 301 along surfaces 303a, 303b, respectively. Preferably surfaces 303a, 303b each exhibit a taper A of about 30 degrees. Tapers A other than about 30 degrees are possible and are within the scope of the present invention.

Figure 3B:
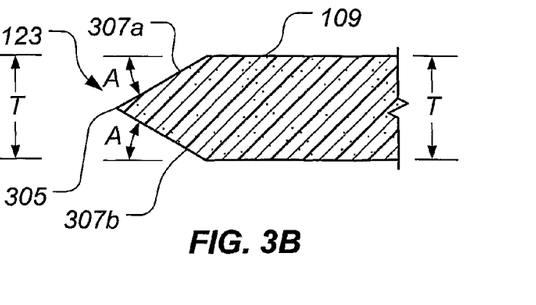

While a frustotriangular cross-sectional edge profile defining edge flat 301 is preferred to mitigate impact damage to edge 123, edge 123 may taper to substantially a knife edge, as shown in FIG. 3B. In the illustrated embodiment, edge 123 transitions from thickness T of side portion 109 to a miniscule thickness at 305 along surfaces 307a, 307b.

Figure 3C:
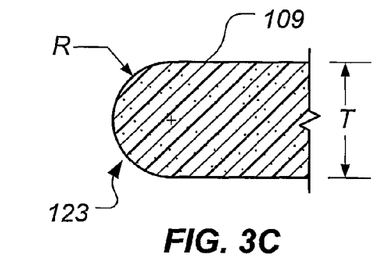
Figure 3D:
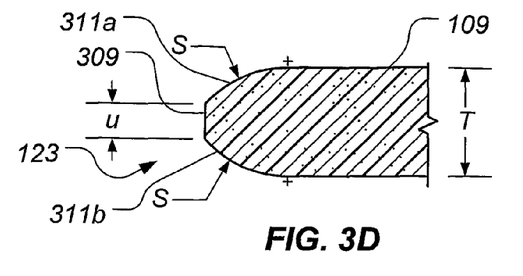

Alternatively, as depicted in FIG. 3C, edge 123 may exhibit a radiused edge profile. In the illustrated embodiment, edge 123 exhibits an edge profile having a radius R that is equal to about one-half of thickness T of side portion 109 of rotor yoke 101. The scope of the present invention, however, is not so limited. Rather, edge 123 may define a profile having a radius other than about one-half of thickness T of side portion 109. As shown in FIG. 3D, edge 123 transitions in thickness from a thickness T of side portion 109 to a thickness u of edge flat 309 along radiused surfaces 311a, 311b, respectively. In the illustrated embodiment, surfaces 311a, 311b exhibit radii S that are greater than about one-half of thickness T of side portion 109.

It should be noted that the particular profiles for edge 123 illustrated in FIGS. 3A-3D are merely exemplary and are not exhaustive. Other profiles for edge 123 are possible and these profiles are within the scope of the present invention, so long as edge 123 exhibits a thickness less than thickness T of side portion 109, which is adjacent to edge 123. Moreover, it will be appreciated that, in various embodiments, the profiles illustrated in FIGS. 3A-3D may be applied to any of the edges of rotor yoke 101, such as outer edge 123 and/or inner edges 125. It will also be appreciated that one or more portions of outer edge 123 and/or inner edges 125 exhibit a reduced thickness, as compared to adjacent portions of rotor yoke 101.

It should also be noted that the profiles exhibited by one or more edges of rotor yoke 101, such as the profiles illustrated in FIGS. 3A-3D, are defined during the composite laminate molding process or may be generated after the molding process has been completed. For example, a mold is provided and utilized that defines the overall shape of rotor yoke 101 as well as the edge profile or profiles, such that the edge profiles are molded in place. In such embodiments, the edge profile or profiles may exhibit surfaces having draft angles or other such features to enhance removal of rotor yoke 101 from the mold.

In other embodiments, the profiles exhibited by one or more edges of rotor yoke 101 are machined, such as by milling, grinding, routing, or the like. For example, the profile of edge 123 illustrated in FIG. 3A may be generated by routing, in one or more passes or operations, to form edge flat 301 and surfaces 303a, 303b. Alternatively, the profiles of one or more edges of rotor yoke 101 may be produced using both molding and machining processes. Again referring to the particular edge configuration of FIG. 3A, for example, edge flat 301 may be molded-in, while surfaces 303a, 303b are machined after molding. It will be appreciated that other combinations of molding and machining are possible and such combinations are within the scope of the present invention.

Figure 4:
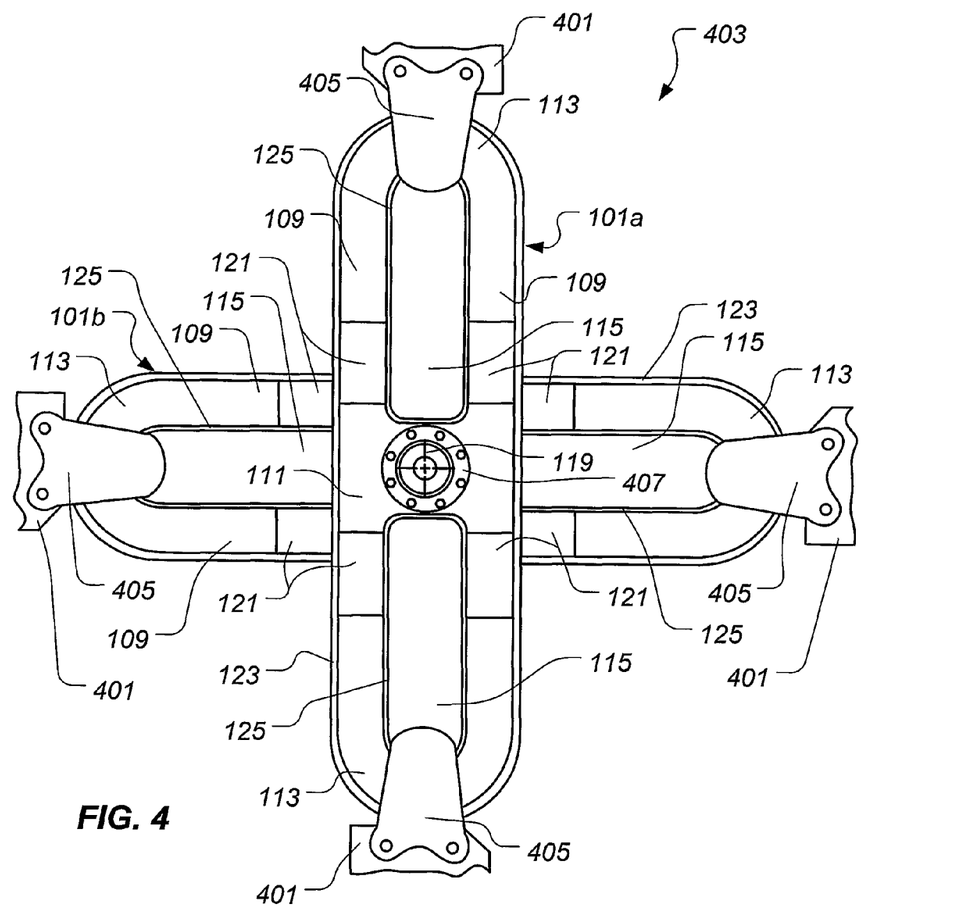
FIG. 4 is a top, plan view of a rotor yoke assembly of the present invention incorporating two rotor yokes of FIG. 1.

FIG. 4 illustrates two rotor yokes 101a, 101b, each corresponding to rotor yoke 101 of FIGS. 1 and 2, which are assembled into a rotor yoke assembly 403. For clarity, certain elements of rotor yokes 101a, 101b are not labeled in FIG. 4 but can be referenced in rotor yoke 101 of FIGS. 1 and 2. In the illustrated embodiment, rotor yoke assembly 403 comprises a first rotor yoke 101a and a second rotor yoke 101b, substantially aligned at central axis 119 and fixedly clocked about 90 degrees from one another. Blades 401 are mechanically coupled with outboard portions 113 via blade fittings 405. Mast 103, shown in FIGS. 1 and 2, is mechanically coupled with rotor yokes 101a, 101b at central portions 111 via mast fitting 407. Generally, mast 103 rotates rotor yoke assembly 403 to, in turn, rotate blades 401 to lift and propel the helicopter. In operation, however, other elements, apparatuses, and/or devices are attached to or coupled with rotor yoke assembly 403 but are not illustrated in FIG. 4 for clarity. It should be noted that the particular configuration of rotor yoke assembly 403 illustrated in FIG. 4 is merely exemplary. For example, three rotor yokes 101 may be fixedly clocked about 60 degrees from one another, such that six helicopter blades (e.g., helicopter blades 401) are coupled therewith. Other configurations of rotor yoke assembly 403 are possible and such configurations are within the scope of the present invention.

Figure 5:
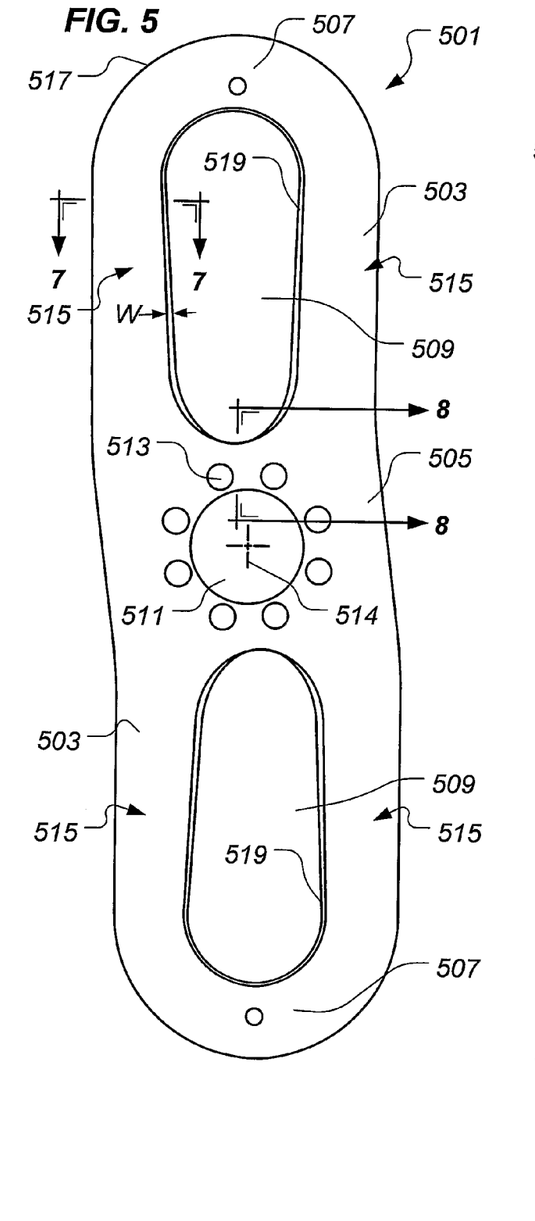
FIG. 5 is a top, plan view of a second illustrative embodiment of a rotor yoke according to the present invention.
Figure 6:
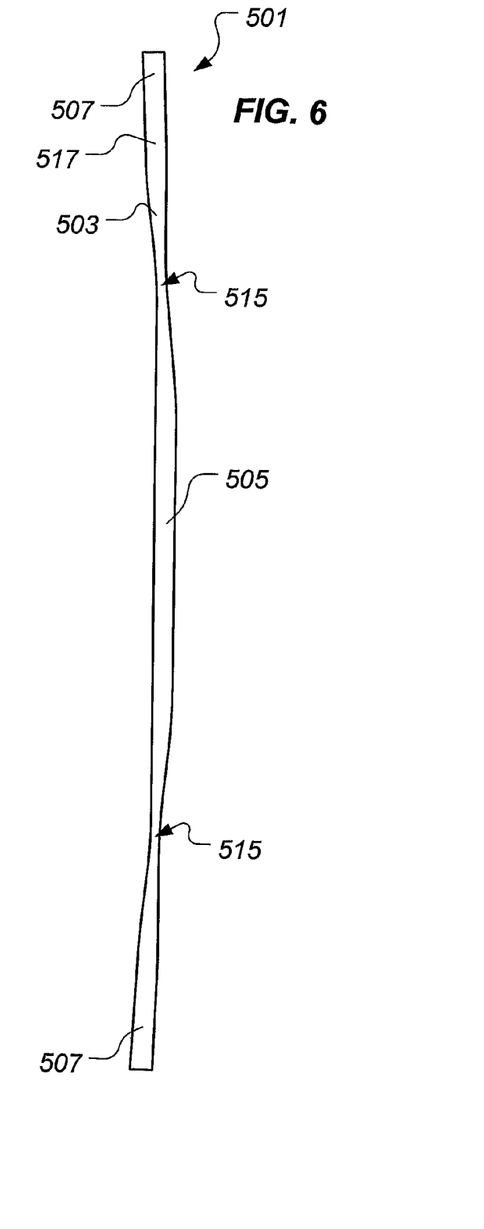
FIG. 6 is a side, elevational view of the rotor yoke of FIG. 5.

FIGS. 5 and 6 depict a second illustrative embodiment of a rotor yoke 501 according to the present invention. FIG. 5 provides a top, plan view of rotor yoke 501 and FIG. 6 depicts a side, elevational view of rotor yoke 501. As in the previous embodiment, rotor yoke 501 is employed to interconnect a helicopter mast (not shown) and a pair of helicopter blades (such as blades 401 of FIG. 4). In the illustrated embodiment, rotor yoke 501 comprises a pair of spaced apart longitudinal side portions 503 interconnected by a transverse central portion 505, at which the mast is attached. The ends of side portions 503 are interconnected by rounded, outboard portions 507. The blades (e.g., blades 401 of FIG. 4) are mechanically coupled with rotor yoke 501 at outboard portions 507. Side portions 503, central portion 505, and outboard portions 507 define, in this particular embodiment, two openings 509 in which various components of the helicopter are mounted but not shown. In some embodiments, however, openings 509 are omitted. The mast is received into a hole 511 defined by central portion 505 and rotor yoke 501 is mounted to the mast via fasteners (not shown) disposed in fastener openings 513 (only one labeled for clarity). A center 514 of rotor yoke 501 substantially coincides with a central, longitudinal axis (such as axis 119 of FIGS. 1 and 2) of the mast.

As in the previous embodiment, each side portion 503 of this illustrative embodiment of rotor yoke 501 defines two flexure portions, shown generally at 515. In various embodiments, rotor yoke 501 comprises one or more plies of composite material, as discussed above concerning rotor yoke 101, and may be produced using any suitable composite manufacturing technique.

In the embodiment of FIGS. 5 and 6, rotor yoke 501 defines an outer edge 517 and inner edges 519 (which define openings 509). As compared to rotor yoke 101, outer edge 517 exhibits substantially the same thickness as adjacent portions of rotor yoke 501. Certain portions of inner edges 519 exhibit reduced thicknesses, as compared to adjacent, or immediately adjacent, portions of rotor yoke 501, while other portions of inner edges 519 exhibit substantially the same thickness as adjacent portions of rotor yoke 501. Moreover, a width W (shown only in FIG. 5) of reduced thickness inner edge 519 may vary along a length of inner edge 519.

Figure 7:
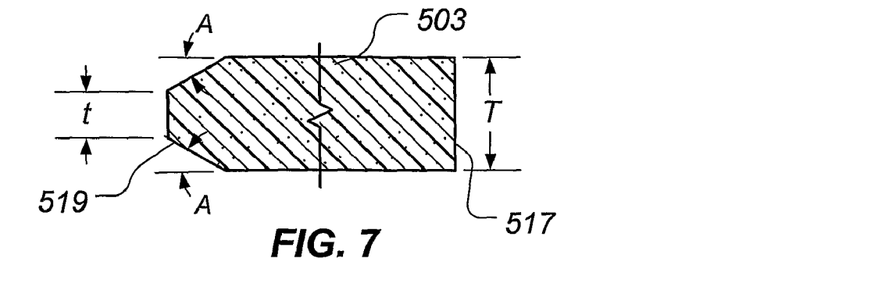
FIG. 7 is a cross-sectional view illustrating one particular, exemplary edge profile of the rotor yoke of FIG. 5, taken along the line 7-7 in FIG. 5.
Figure 8:
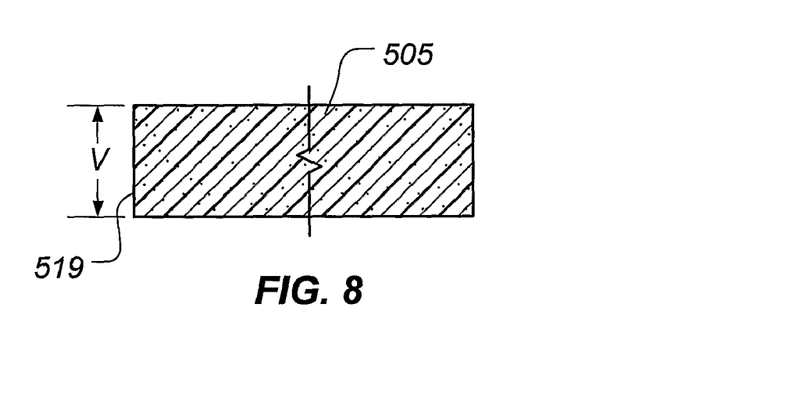
FIG. 8 is a cross-sectional view of the rotor yoke of FIG. 5, taken along the line 8-8 in FIG. 5.

FIG. 7 depicts a cross-sectional view of side portion 503 of rotor yoke 501 taken along the line 7-7 in FIG. 5, showing one particular embodiment of inner edge 519. Note that, as discussed above, outer edge 517 displays a thickness T substantially corresponding to thickness T of adjacent side portion 503. Inner edge 519 has a cross-sectional profile configuration, at the particular location indicated in FIG. 5, corresponding to that of FIG. 3A, described above. However, as shown in FIG. 8, inner edge 519 has a thickness at that particular location that substantially corresponds to thickness V of adjacent central portion 505.

It should be noted, however, that inner edge 519 (or outer edge 517) may instead exhibit any of the profiles illustrated in FIGS. 3B-3D or any other suitable profile such that at least one portion of one of edges 517, 519 has a reduced thickness, as compared to an adjacent portion of rotor yoke 501. In other words, the exemplary edge profiles disclosed herein and depicted in the drawings are not exhaustive of the possible edge profiles encompassed by the present invention. Moreover, different edge profiles may be employed in rotor yoke 501, and the different edge profiles may be applied to adjacent portions of rotor yoke 501 or the different edge profiles may be applied to portions of rotor yoke 501 that are distal from one another.

As will be appreciated having the benefit of the above disclosure, a rotor yoke (e.g., rotor yokes 101; 501; 1101, which is described below; or the like) according to the present invention can be tailored by providing one or more reduced-thickness edges. Preferably, the areas of reduced edge thickness correspond to areas in which high interlaminar shear strain in concentrated. The reduced thickness edges moves and/or distributes the concentration of interlaminar shear strain away from the edge, thus allowing the rotor yoke to withstand higher loads, particularly loads due to flapping of the helicopter blades (e.g., blades 401 shown in FIG. 4 or the like). While certain edge configurations are disclosed herein as being preferable, other configurations of rotor yokes employed in other operational environments may perform better wherein other edge configurations are used.

Figure 9:
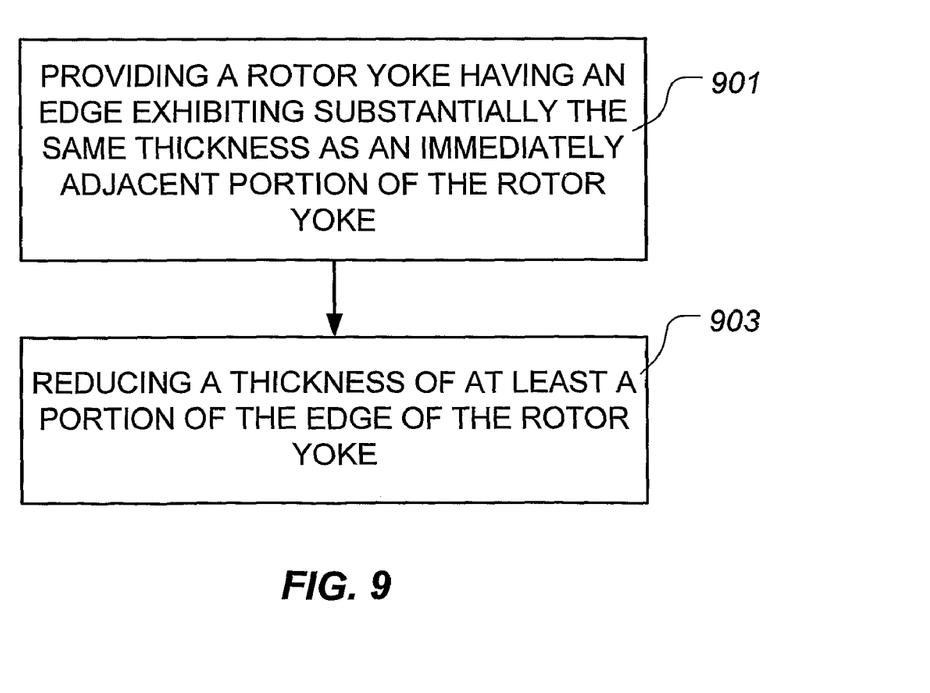
FIG. 9 is a block diagram depicting a first illustrative embodiment of a method for making a rotor yoke according to the present invention.

FIG. 9 depicts a first illustrative embodiment of a method for making a rotor yoke according to the present invention. The method includes the step of providing a rotor yoke having an edge exhibiting substantially the same thickness as an adjacent portion of the rotor yoke (block 901). The method further includes the step of reducing a thickness of at least a portion of the edge of the rotor yoke (block 903).

Figure 10:
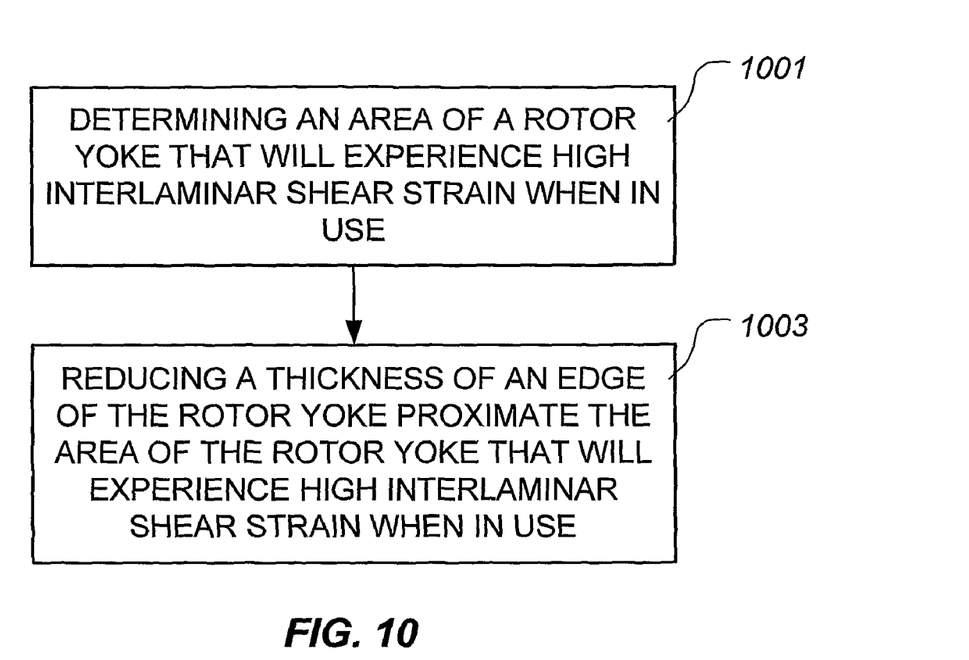
FIG. 10 is a block diagram depicting a second illustrative embodiment of a method for making a rotor yoke according to the present invention.

FIG. 10 depicts a second illustrative embodiment of a method for making a rotor yoke according to the present invention. The method includes the step of determining an area of the rotor yoke that will experience high interlaminar shear strain when in use (block 1001). The step of determining the area of the rotor yoke that will experience high interlaminar shear strain when in use may be accomplished by computer simulation, off-vehicle testing, analysis of the rotor yoke after flight, or any other suitable technique. The method further includes the step of reducing a thickness of an edge of the rotor yoke proximate the area of the rotor yoke that will experience high interlaminar shear strain when in use (block 1003). It should be noted that the present invention encompasses reducing the thickness of the edge by molding in the reduced thickness or by a post-molding process, such as by machining.

It should be noted that, in certain embodiments, openings, such as openings 115, 509 defined by rotor yokes 101, 501, respectively, are omitted. The scope of the present invention encompasses embodiments wherein such openings are omitted. In such embodiments, at least a portion of an edge of the rotor yoke exhibits a reduced thickness as compared to a thickness of an adjacent portion of the rotor yoke.

Figure 11:
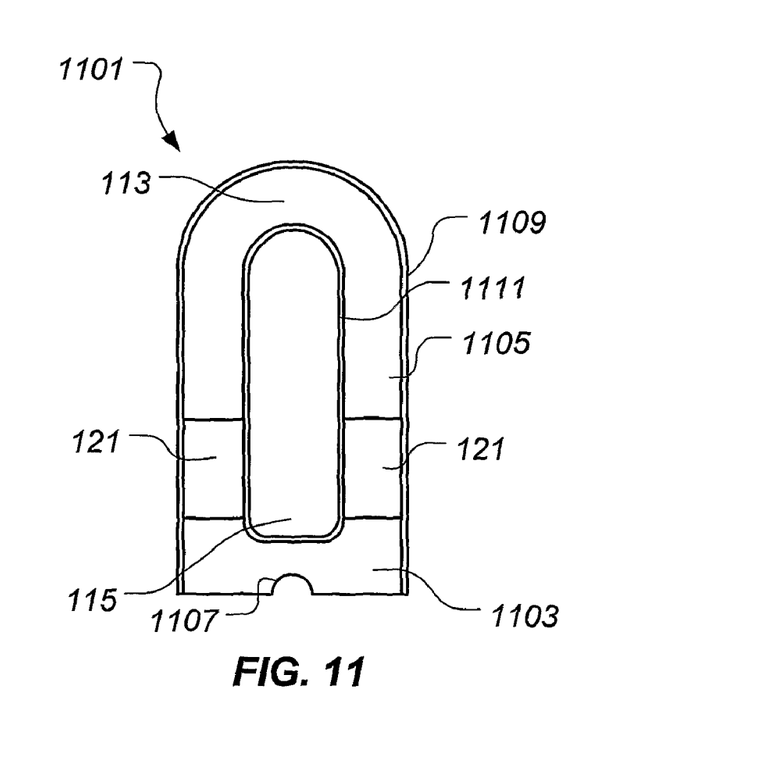
FIG. 11 is a top, plan view of a third illustrative embodiment of a rotor yoke according to the present invention.

While the rotor yoke embodiments described above each comprise two areas for coupling with helicopter blades, the scope of the present invention is not so limited. Rather, as depicted in FIG. 11, a third illustrative embodiment of a rotor yoke 1101 according to the present invention extends from a central, mast attachment portion 1103 to an outboard, blade attachment portion 113. In the illustrated embodiment, side portions 1105 extend between central portion 1103 and outboard portion 113. The blades (e.g., blades 401 of FIG. 4) are mechanically coupled with rotor yoke 1101 at outboard portions 113. Side portions 1105, central portion 1103, and outboard portions 113 define, in this particular embodiment, an opening 115 in which various components of the helicopter are mounted but not shown. In some embodiments, however, opening 115 is omitted. The mast is received into a recess 1107 defined by central portion 1103 and rotor yoke 1101 is mounted to the mast at central portion 1103.

As in the previous embodiment, each side portion 1105 of this illustrative embodiment of rotor yoke 1101 defines a flexure portion, shown generally at 121. In various embodiments, rotor yoke 1101 comprises one or more plies of composite material, as discussed above concerning rotor yoke 101, and may be produced using any suitable composite manufacturing technique.

In the embodiment of FIG. 11, rotor yoke 1101 defines an outer edge 1109 and an inner edge 1111 (which define opening 115, if present). It should be noted, however, that inner edge 1111 (or outer edge 1109) may exhibit any of the profiles illustrated in FIGS. 3A-3D or any other suitable profile such that at least one portion of one of edges 1109, 1111 has a reduced thickness, as compared to an adjacent portion of rotor yoke 1101. In other words, the exemplary edge profiles disclosed herein and depicted in the drawings are not exhaustive of the possible edge profiles encompassed by the present invention. Moreover, different edge profiles may be employed in rotor yoke 1101, and the different edge profiles may be applied to adjacent portions of rotor yoke 1101 or the different edge profiles may be applied to portions of rotor yoke 1101 that are distal from one another. A rotor yoke, such as rotor yoke 1101, is particularly useful when a helicopter includes an odd number of blades, such as five helicopter blades.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. A rotor yoke for a helicopter, comprising:
   a blade attachment portion;
   a mast attachment portion;

an intermediate portion extending between the blade attachment portion and the mast attachment portion, wherein the intermediate portion, the blade attachment portion, and the mast attachment portion define an inner edge, such that the inner edge defines an opening; and a peripheral, outer edge extending about the blade attachment portion, the intermediate portion, and the mast attachment portion;

wherein both the outer edge and the inner edge include reduced thickness portions exhibiting thicknesses that are less than thicknesses of portions of the rotor yoke adjacent the reduced thickness portions;

wherein the reduced thickness portion extends substantially along an entirety of the outer edge and the inner edge; and wherein the blade attachment portion, the mast attachment portion, and the intermediate portion are formed from a plurality of loop layers and a plurality of reinforcement layers, the loop layers being configured with a unidirectional fiber roving, the reinforcing layers being comprised of a cross-ply of fibers.

2. The rotor yoke, according to claim 1, wherein the reduced thickness portion exhibits a thickness that is less than a thickness of an immediately adjacent portion of the rotor yoke.

3. The rotor yoke, according to claim 1, wherein the reduced thickness portion is frustotriangular in cross-section.

4. The rotor yoke, according to claim 1, wherein the reduced thickness portion comprises:
   a first tapered surface;
   a second tapered surface; and
   an edge flat extending between the first tapered surface and the second tapered surface.

5. The rotor yoke, according to claim 4, wherein at least one of the first tapered surface and the second tapered surface exhibits a taper of about 30 degrees.

6. The rotor yoke, according to claim 1, wherein the reduced thickness portion comprises:
   a first tapered surface; and
   a second tapered surface extending to the first tapered surface.

7. The rotor yoke, according to claim 6, wherein at least one of the first tapered surface and the second tapered surface exhibits a taper of about 30 degrees.

8. The rotor yoke, according to claim 1, wherein the reduced thickness portion exhibits a radius.

9. The rotor yoke, according to claim 8, wherein the radius corresponds to the thickness of the rotor yoke adjacent to the reduced thickness portion.

10. The rotor yoke, according to claim 1, wherein the reduced thickness portion comprises:
    a first radiused surface;
    a second radiused surface; and
    an edge flat extending between the first radiused surface and the second radiused surface.

11. The rotor yoke, according to claim 1, wherein the reduced thickness portion is located in an area of high interlaminar shear strain when the rotor yoke is in service.

12. The rotor yoke, according to claim 1, further comprising:
a second blade attachment portion;
wherein the intermediate portion extends between the mast attachment portion and the blade attachment portions; and
wherein the outer edge extends about the blade attachment portions, the intermediate portion, and the mast attachment portion.

13. A rotor yoke for a helicopter, comprising:
a pair of spaced apart longitudinal, side portions having ends;
a transverse, central portion interconnecting the side portions; and
a pair of outboard portions interconnecting the ends of the side portions;
wherein the side portions, central portion, and end portions define an outer edge and an inner edge, such that the inner edge defines an opening; and
wherein both the outer edge and the inner edge include reduced thickness portions exhibiting thicknesses that are less than thicknesses of portions of the rotor yoke adjacent the reduced thickness portions;
wherein the reduced thickness portion extends substantially along an entirety of the outer edge and the inner edge; and
wherein the blade attachment portion, the mast attachment portion, and the intermediate portion are formed from a plurality of loop layers and a plurality of reinforcement layers, the loop layers being configured with a unidirectional fiber roving, the reinforcing layers being comprised of a cross-ply of fibers.

14. A rotor yoke assembly, comprising:
a plurality of rotor yokes, fixedly clocked with respect to one another;
wherein at least one of the plurality of rotor yokes comprises:
   a blade attachment portion;
   a mast attachment portion;
   an intermediate portion extending between the blade attachment portion and the mast attachment portion, wherein the intermediate portion, the blade attachment portion, and the mast attachment portion define an inner edge, such that the inner edge defines an opening; and
   a peripheral, outer edge extending about the blade attachment portion, the intermediate portion, and the mast attachment portion;
wherein both the outer edge and the inner edge include reduced thickness portions exhibiting thicknesses that are less than thicknesses of portions of the rotor yoke adjacent the reduced thickness portions;
wherein the reduced thickness portion extends substantially along an entirety of the outer edge and the inner edge; and
wherein the blade attachment portion, the mast attachment portion, and the intermediate portion are formed from a plurality of loop layers and a plurality of reinforcement layers, the loop layers being configured with a unidirectional fiber roving, the reinforcing layers being comprised of a cross-ply of fibers.

* * * * *